(12) United States Patent
Ross et al.

(10) Patent No.: US 9,856,959 B2
(45) Date of Patent: Jan. 2, 2018

(54) LATCHING CLUTCH CONTROL SYSTEM

(71) Applicant: GM Global Technology Operations LLC, Detroit, MI (US)

(72) Inventors: Craig S. Ross, Ypsilanti, MI (US); Paul G. Otanez, Troy, MI (US)

(73) Assignee: GM GLOBAL TECNOLOGY OPERATIONS LLC, Detroit, MI (US)

( * ) Notice: Subject to any disclaimer, the term of this patent is extended or adjusted under 35 U.S.C. 154(b) by 172 days.

(21) Appl. No.: 15/012,433

(22) Filed: Feb. 1, 2016

(65) Prior Publication Data

US 2016/0146325 A1  May 26, 2016

Related U.S. Application Data

(62) Division of application No. 13/867,495, filed on Apr. 22, 2013, now Pat. No. 9,249,844.

(60) Provisional application No. 61/640,944, filed on May 1, 2012.

(51) Int. Cl.
*F16H 31/00* (2006.01)
*F16H 47/04* (2006.01)
(Continued)

(52) U.S. Cl.
CPC ............ *F16H 47/04* (2013.01); *F16D 25/14* (2013.01); *F16D 48/02* (2013.01); *F16D 48/066* (2013.01); *F16H 3/62* (2013.01); *F16H 3/66* (2013.01); *F16H 61/0021* (2013.01); *F16D 2048/0203* (2013.01); *F16D 2048/0221* (2013.01);
(Continued)

(58) Field of Classification Search
CPC ........ F16H 47/04; F16H 3/66; F16H 61/0021; F16H 3/62; F16H 2200/8003; F16H 2200/201; F16H 2312/14; F16H 2061/0034; F16D 48/066; F16D 48/02; F16D 25/14; F16D 2048/0221; F16D 2048/0257; F16D 2048/0233; F16D 2048/0203
See application file for complete search history.

(56) References Cited

U.S. PATENT DOCUMENTS 4,046,031 A * 9/1977 Ott ........................... F16H 3/66
475/280
5,223,432 A 6/1993 Wirz et al.
(Continued)

FOREIGN PATENT DOCUMENTS

CN  101235393 A  8/2003
CN  102032340 A  4/2011

*Primary Examiner* — David J Hlavka

(57) ABSTRACT

A clutch latching system is provided for latching and draining a torque transmitting mechanism. The latching clutch control system may include a latching valve, a release valve, and an accumulator. The clutch latching system may include a clutch feed channel configured to provide hydraulic fluid from a pressurized source to a torque transmitting device when the torque transmitting device is engaged and the engine is running. A latching valve connects the clutch feed channel to the torque transmitting device. The latching valve is configured to selectively trap pressurized hydraulic fluid within the torque transmitting device. A hydraulic pressure storage circuit configured to selectively provide pressurized hydraulic fluid to the latching valve to unlatch the latching valve. A multiple speed transmission is also provided.

14 Claims, 7 Drawing Sheets

(51) Int. Cl.
  *F16D 48/02* (2006.01)
  *F16H 3/62* (2006.01)
  *F16H 61/00* (2006.01)
  *F16D 48/06* (2006.01)
  *F16H 3/66* (2006.01)

(52) U.S. Cl.
  CPC ............... *F16D 2048/0233* (2013.01); *F16D 2048/0257* (2013.01); *F16H 2061/0034* (2013.01); *F16H 2200/003* (2013.01); *F16H 2200/201* (2013.01); *F16H 2312/14* (2013.01)

(56) References Cited

U.S. PATENT DOCUMENTS

| | | | |
|---|---|---|---|
| 5,230,310 A | 7/1993 | Hashimoto | |
| 6,572,507 B1* | 6/2003 | Korkmaz | F16H 3/66 475/276 |
| 6,932,735 B2* | 8/2005 | Kao | F16H 3/66 475/276 |
| 7,935,025 B1 | 5/2011 | Lee et al. | |
| 8,403,793 B2 | 3/2013 | Moorman et al. | |
| 8,568,262 B2 | 10/2013 | Moorman et al. | |
| 8,636,614 B2 | 1/2014 | Moorman et al. | |
| 2006/0094555 A1* | 5/2006 | Long | F16H 61/12 475/116 |
| 2008/0182709 A1 | 7/2008 | Hart et al. | |
| 2009/0275441 A1* | 11/2009 | Bai | F16D 48/066 477/150 |
| 2011/0139285 A1 | 6/2011 | Lundberg et al. | |
| 2011/0209470 A1* | 9/2011 | Dougan | F16H 61/0021 60/413 |
| 2013/0232962 A1 | 9/2013 | Marin et al. | |
| 2013/0233396 A1 | 9/2013 | Lee et al. | |
| 2013/0281253 A1 | 10/2013 | Ross et al. | |

* cited by examiner

LATCHING CLUTCH CONTROL SYSTEM

CROSS-REFERENCE TO RELATED APPLICATIONS

This application is a divisional of U.S. application Ser. No. 13/867,495 filed on Apr. 22, 2013 which in turn claims the benefit of U.S. Provisional Application No. 61/640,944 filed on May 1, 2012. The disclosures of the above applications are incorporated herein by reference.

FIELD

The present invention relates to a system for use in an automatic transmission having torque-transmitting devices that are selectively engageable to achieve multiple gear ratios. More specifically, the present invention relates to a control system for holding fluid pressure within a torque-transmitting device.

BACKGROUND

The statements in this section merely provide background information related to the present disclosure and may or may not constitute prior art.

A typical multiple speed transmission uses a combination of a plurality of torque transmitting mechanisms, planetary gear arrangements and fixed interconnections to achieve a plurality of gear ratios. The number and physical arrangement of the planetary gear sets, generally, are dictated by packaging, cost and desired speed ratios.

In order to increase the fuel economy of motor vehicles, it may be desirable to stop the engine during certain circumstances, such as when stopped at a red light or idling. However, after the engine has been shut down and has remained off for an extended period of time, the fluid generally tends to drain down from the passages into a transmission sump under the force of gravity. Upon engine restart, the transmission may take an appreciable amount of time to establish pressure before full transmission operation may resume.

In some powertrain systems, it is also generally desirable to have quick shift timing. In addition, in engine stop/start systems, it is desirable to have quick system recovery. As such, it may be desirable to maintain pressure in a clutch, even when line pressure and/or clutch feed pressure is zero or near zero. In other situations, however, clutch pressure should be eliminated, such as when putting a vehicle in reverse. Accordingly, there is a need for a clutch pressure control system that allows for timely shifting and recovery, even if the engine or motor is shut off, but that also allows a vehicle to move in reverse or to otherwise deactivate a clutch or multiple clutches, if desired.

SUMMARY

The present disclosure provides a control system for latching and/or unlatching clutch pressure in one or more torque transmitting mechanisms in an automatic transmission.

In one variation, a latching valve is located between the torque transmitting mechanism and the control fluid that feeds the torque transmitting mechanism, allowing fluid to flow into the clutch cavity of the torque transmitting mechanism but not to return therefrom. One or more release valves are opened to release fluid from an accumulator to exert fluid pressure on the latching valve. Upon exerting fluid pressure on the latching valve, the latching valve opens to allow fluid to flow from the clutch cavity when it is desired to release clutch pressure, such as when the vehicle is put in reverse.

In another variation, which may be combined with or separate from the other variations described herein, a hydraulic fluid latching system for a torque transmitting device of a transmission of a motor vehicle having an engine is provided. The hydraulic fluid latching system includes a clutch feed channel configured to provide hydraulic fluid from a pressurized source to a torque transmitting device when the torque transmitting device is engaged and the engine is running. A latching valve connects the clutch feed channel to the torque transmitting device. The latching valve is configured to selectively trap pressurized hydraulic fluid within the torque transmitting device. A hydraulic pressure storage circuit is configured to selectively provide pressurized hydraulic fluid to the latching valve to unlatch the latching valve.

In yet another variation, which may be combined with or separate from the other variations described herein, a hydraulic control system in a transmission having a torque transmitting is provided for a motor vehicle having an engine. The hydraulic control system includes a source of pressurized hydraulic fluid for providing a pressurized hydraulic fluid and a main line circuit in fluid communication with the source of pressurized hydraulic fluid. A clutch feed channel is in fluid communication with the source of pressurized hydraulic fluid. The clutch feed channel is configured to provide hydraulic fluid from the source to the torque transmitting device when the torque transmitting device is engaged and the engine is running.

A latching valve connects the clutch feed channel to the torque transmitting device. The latching valve is configured to selectively trap pressurized hydraulic fluid within the torque transmitting device. The clutch feed channel has an inlet portion and a clutch portion. The clutch portion is in communication with the latching valve, and the inlet portion is in communication with the source of pressurized hydraulic fluid. An inlet valve connects the inlet portion to the clutch portion. Pressurized hydraulic fluid is stored in an accumulator when the engine is on. A release valve is configured to selectively hold the pressurized hydraulic fluid within an accumulator. The release valve is configured to selectively open to allow the pressurized hydraulic fluid to flow from the accumulator to the latching valve to unlatch the latching valve.

In still another variation, which may be combined with or separate from the other variations described herein, a multiple speed automatic transmission for use with a vehicle having an engine is provided. The multiple speed automatic transmission includes an input member, an output member, and first, second, and third planetary gear sets each having first, second and third members. A first interconnecting member continuously interconnects the first member of the first planetary gear set with the second member of the second planetary gear set. A second interconnecting member continuously interconnects the second member of the first planetary gear set with the third member of the third planetary gear set. A third interconnecting member continuously interconnects the third member of the second planetary gear set with the second member of the third planetary gear set.

Five torque transmitting devices are each selectively engageable to interconnect at least one of the first, second, and third members with at least one other of the first members, second members, third members and a stationary member. The torque transmitting devices are selectively engageable to establish a plurality of forward speed ratios and at least one reverse speed ratio between the input member and the output member. A first torque transmitting device of the five torque transmitting devices is in communication with a clutch feed channel configured to provide hydraulic fluid from a pressurized source to the first torque transmitting device when the first torque transmitting device is engaged and the engine is running. A latching valve connects the clutch feed channel to the first torque transmitting device. The latching valve is configured to selectively trap pressurized hydraulic fluid within the first torque transmitting device. A hydraulic pressure storage circuit is configured to selectively provide pressurized hydraulic fluid to the latching valve to unlatch the latching valve.

Further features, advantages, and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, emphasis instead being placed upon illustrating the principles of the invention. Moreover, in the figures, like reference numerals designate corresponding parts throughout the views. In the drawings.

DETAILED DESCRIPTION

The following description is merely exemplary in nature and is not intended to limit the present disclosure, application, or uses.

Figure 1:
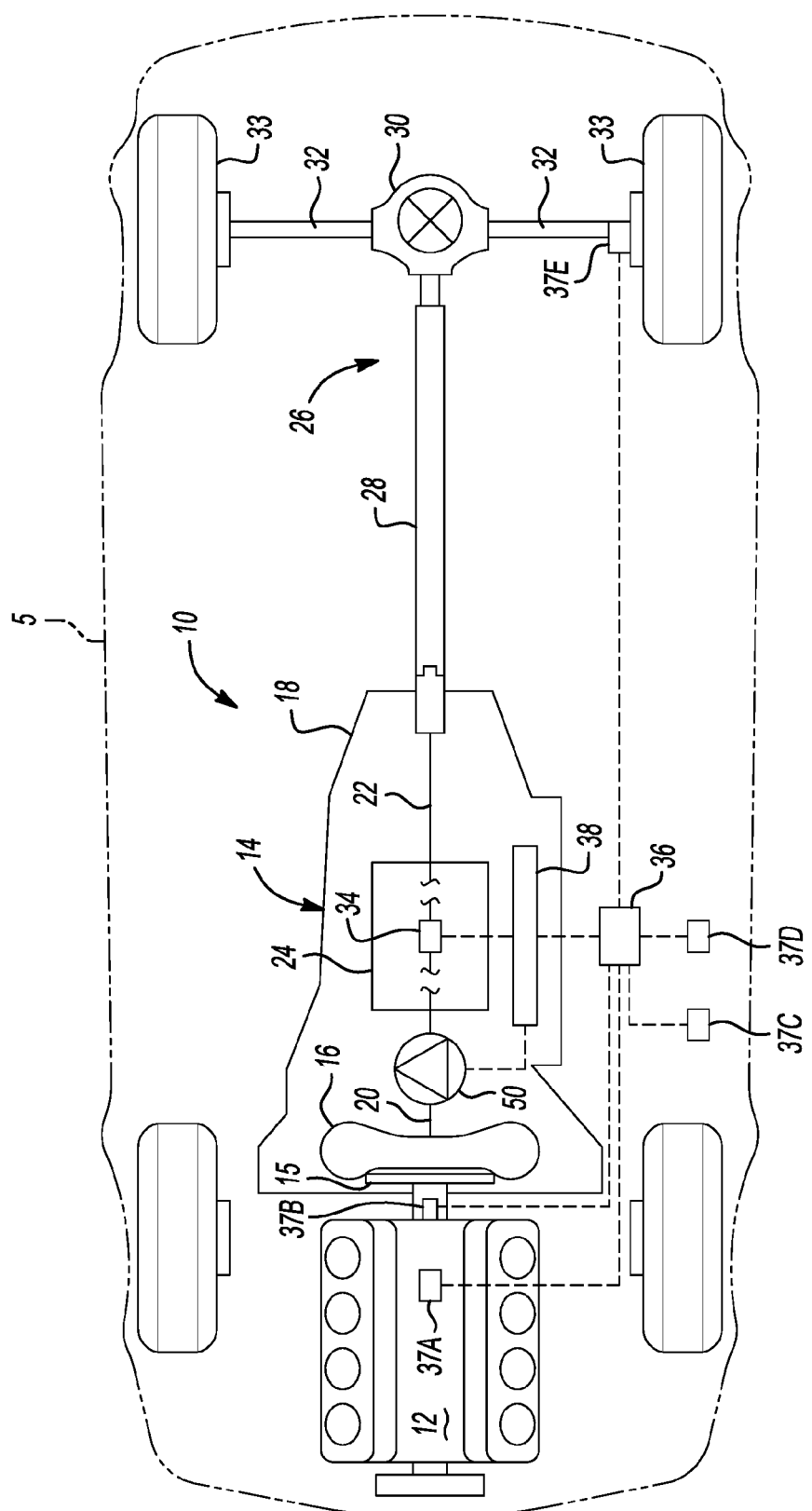
FIG. 1 is a schematic diagram of an exemplary powertrain in a motor vehicle according to the principles of the present invention.

With reference to FIG. 1, a motor vehicle is shown and generally indicated by reference number 5. The motor vehicle 5 is illustrated as a passenger car, but it should be appreciated that the motor vehicle 5 may be any type of vehicle, such as a truck, van, etc. The motor vehicle 5 includes an exemplary powertrain 10. It should be appreciated at the outset that while a rear-wheel drive powertrain has been illustrated, the motor vehicle 5 may have a front-wheel drive powertrain without departing from the scope of the present invention. The powertrain 10 generally includes an engine 12 interconnected with a transmission 14.

The engine 12 may be a conventional internal combustion engine or an electric motor, or any other type of prime mover, without departing from the scope of the present disclosure. The engine 12 supplies a driving torque to the transmission 14 through a flexplate 15 or other connecting device that is connected to a starting device 16. The starting device 16 may be a hydrodynamic device, such as a fluid coupling or torque converter, a wet or dry clutch, or an electric motor. It should be appreciated that any starting device between the engine 12 and the transmission 14 may be employed.

The transmission 14 includes a typically cast, metal housing 18 which encloses and protects the various components of the transmission 14. The housing 18 includes a variety of apertures, passageways, shoulders and flanges which position and support these components. Generally speaking, the transmission 14 includes a transmission input shaft 20 and a transmission output shaft 22. Disposed between the transmission input shaft 20 and the transmission output shaft 22 is a gear and clutch arrangement 24. The transmission input shaft 20 is functionally interconnected with the engine 12 via the starting device 16 and receives input torque or power from the engine 12. Accordingly, the transmission input shaft 20 may be a turbine shaft in the case where the starting device 16 is a hydrodynamic device, dual input shafts where the starting device 16 is dual clutch, or a drive shaft where the starting device 16 is an electric motor. The transmission output shaft 22 is preferably connected with a final drive unit 26 which includes, for example, propshaft 28, differential assembly 30, and drive axles 32 connected to wheels 33. The transmission input shaft 20 is coupled to and provides drive torque to the gear and clutch arrangement 24.

The gear and clutch arrangement 24 includes a plurality of gear sets, a plurality of clutches and/or brakes, and a plurality of shafts. The plurality of gear sets may include individual intermeshing gears, such as planetary gear sets, that are connected to or selectively connectable to the plurality of shafts through the selective actuation of the plurality of clutches/brakes. The plurality of shafts may include layshafts or countershafts, sleeve and center shafts, reverse or idle shafts, or combinations thereof. The clutches/brakes, indicated schematically by reference number 34, are selectively engageable to initiate at least one of a plurality of gear or speed ratios by selectively coupling individual gears within the plurality of gear sets to the plurality of shafts. It should be appreciated that the specific arrangement and number of the gear sets, clutches/brakes 34, and shafts within the transmission 14 may vary without departing from the scope of the present disclosure.

The motor vehicle 5 includes a control system 36. The control system 36 may include a transmission control module, an engine control module, or a hybrid control module, or any other type of controller. The control system 36 may include one or more electronic control devices having a preprogrammed digital computer or processor, control logic, memory used to store data, and at least one I/O peripheral. The control logic includes a plurality of logic routines for monitoring, manipulating, and generating data. The control module 36 controls the actuation of the clutches/brakes 34 via a hydraulic control system 38. The hydraulic control system 38 is operable to selectively engage the clutches/brakes 34 by selectively communicating a hydraulic fluid, for example, from a pump 50, to the clutches/brakes 34 that engages the clutches/brakes 34. The control module 36 is also in communication with a plurality of sensors located throughout the motor vehicle 5. For example, the control module 36 communicates with engine speed and temperature sensors 37A and 37B, a brake pedal position sensor 37C, an ignition key sensor 37D, a vehicle speed sensor 37E, to name but a few.

Figure 2:
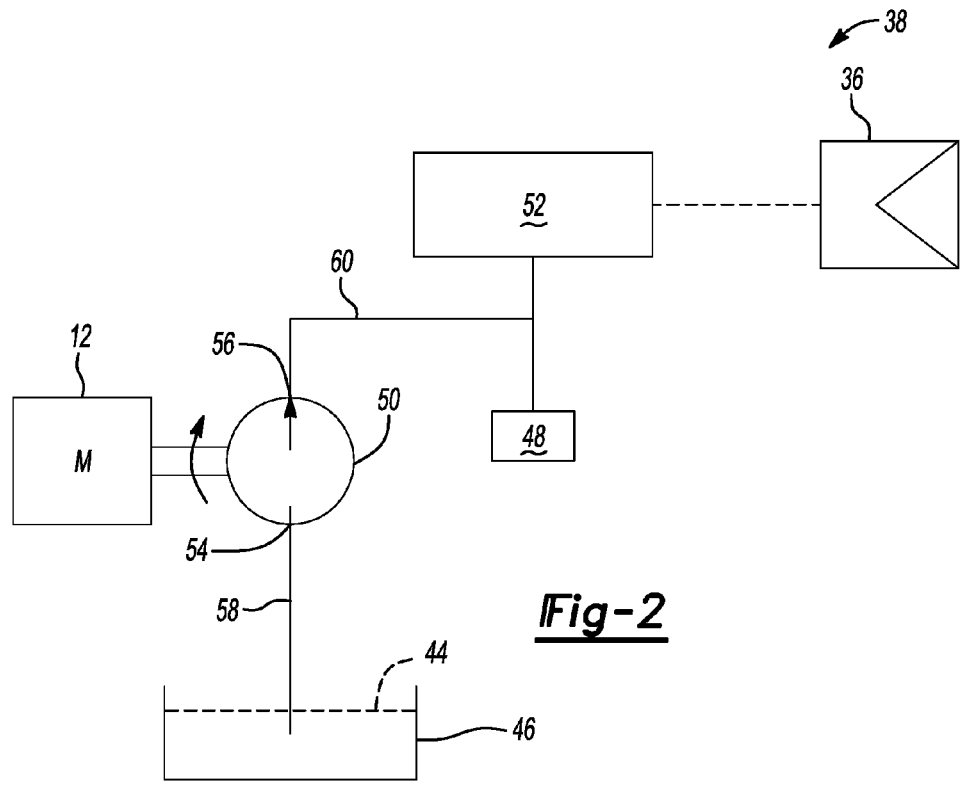
FIG. 2 is a schematic diagram of a portion of an exemplary hydraulic control system in accordance with the principles of the present invention.

Turning to FIG. 2, a portion of the hydraulic control system 38 is illustrated. At the outset it should be appreciated that the portion of the hydraulic control system 38 shown in FIG. 2 is exemplary and that other configurations may be employed. The hydraulic control system 38 is operable to selectively engage the clutches/brakes 34 (see FIG. 1) by selectively communicating a hydraulic fluid 44, such as automatic transmission fluid, from a sump 46 to a clutch actuation circuit 48. The controller 36 may control the hydraulic control system 38, by way of example. The clutch actuation circuit 48 includes clutch control solenoids, valves, and actuators operable to engage the plurality of clutches/brakes 34 (shown in FIG. 1). The hydraulic fluid 44 is communicated to the clutch actuation circuit 48 under pressure from either a pump 50, which is driven by the engine 12, or an accumulator circuit 52.

The sump 46 is a tank or reservoir to which the hydraulic fluid 44 returns and collects from various components and regions of the automatic transmission 14 (see FIG. 1). The hydraulic fluid 44 is forced from the sump 46 and communicated throughout the hydraulic control system 38 via the pump 50. The pump 50 may be, for example, a gear pump, a vane pump, a gerotor pump, or any other positive displacement pump. The pump 50 includes an inlet port 54 and an outlet port 56. The inlet port 54 communicates with the sump 46 via a suction line 58. The outlet port 56 communicates pressurized hydraulic fluid 44 to a main line pressure circuit 60. The main line pressure circuit 60 may include various optional features including, for example, a spring biased blow-off safety valve, a pressure side filter, or a spring biased check valve.

The main line pressure circuit 60 communicates with the clutch actuation circuit 48, and it may also communicate with an accumulator circuit 52. The accumulator is an energy storage device in which the non-compressible hydraulic fluid 44 is held under pressure by an external source. The accumulator circuit 52 may include an accumulator, a solenoid, and/or a pressure sensor or estimator, by way of example. Other types of sensors, such as volume or position sensors, may also be included. While the accumulator circuit 52 is illustrated as being connected to and therefore charged by the main line pressure circuit 60, it should be understood that the accumulator or the accumulator circuit 52 could alternatively be filled by a different hydraulic circuit, without falling beyond the spirit and scope of the present invention. An example of an accumulator for use with the present invention is disclosed in commonly assigned U.S. patent application Ser. No. 12/635,587 filed Dec. 10, 2009, published as 2011-0139285 hereby incorporated by reference as if fully disclosed herein. The accumulator circuit 52 is operable to supply pressurized fluid 44 back to the hydraulic circuit 60. The accumulator, when charged, effectively replaces the pump 50 as the source of pressurized hydraulic fluid 44, thereby eliminating the need for the pump 50 to run continuously.

Figure 3:
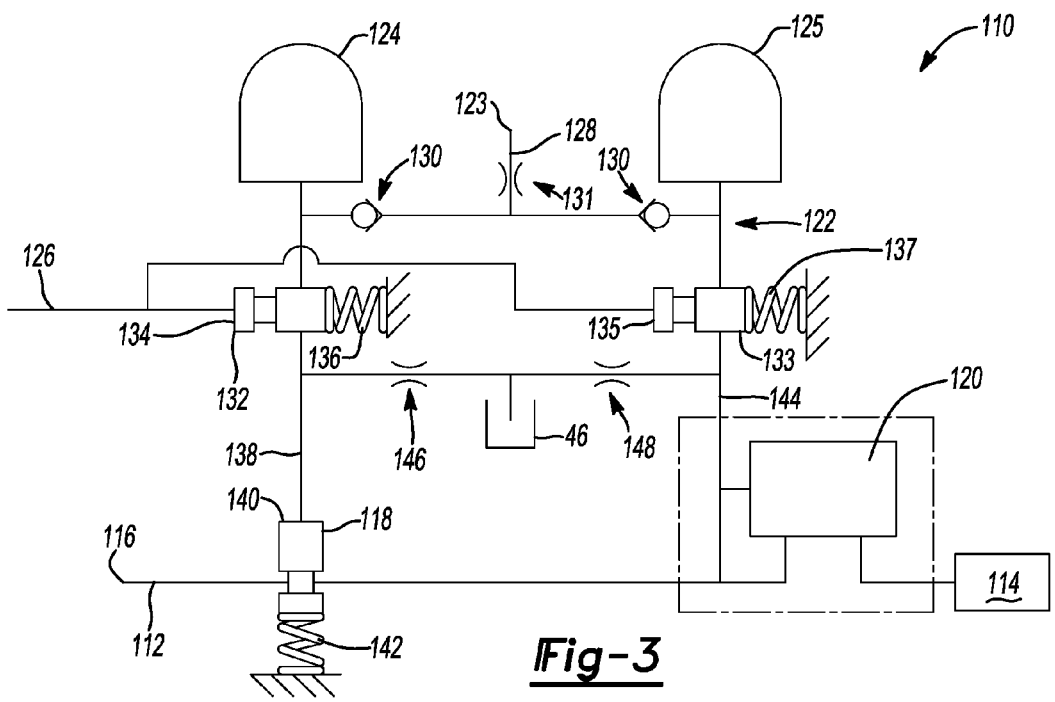
FIG. 3 is a schematic diagram of a variation of a latching clutch control system, according to the principles of the present invention.

Referring to FIG. 3, an example of a latching clutch control system for use as part of the clutch actuation circuit 48 (see FIG. 2) is illustrated and generally designated at 110. The latching clutch control system 110 includes a clutch feed channel 112. When a torque transmitting mechanism 114, such as a clutch or brake, is engaged, hydraulic fluid is fed into an inlet 116 of the clutch feed channel 112. The hydraulic fluid then travels past a clutch feed valve 118, such as a poppet valve, through a latching valve 120, and into the torque transmitting mechanism 114. The clutch feed valve 118 is normally open, in this embodiment.

The latching valve 120 is activated by a pressure higher than the normal operating pressure of the latching valve 120. In other words, the latching valve latches (closes) and holds fluid within the clutch cavity of the torque transmitting mechanism 114 when the fluid pressure of the hydraulic fluid entering the latching valve 120 through the clutch feed channel 112 exceeds a predetermined threshold. In some instances, the latching valve 120 may be enabled to latch fluid within the clutch cavity of the torque transmitting mechanism 114 when the fluid pressure is at between about 1 and 10 bars higher than fluid is being fed normally to the clutch cavity of the torque transmitting mechanism 114. If the pressure in the clutch feed line 112 is reduced to zero, such as when the hydraulic feed to the torque transmitting mechanism 114 is off, the latching valve 120 may be released by exerting a fluid pressure on the latching valve 120, by way of example. For example, a fluid pressure of between about 1 and 10 bars of fluid pressure may be exerted on the latching valve 120 to release the latching valve 120. Accordingly, the latching valve 120 latches and unlatches by applying fluid pressure to it that is above its normal operating pressure, by way of example. A valve sold by LuK may be implemented as the latching valve 120.

Referring to FIGS. 1-3, when the motor vehicle 5 stops (i.e., at a red light for example), it may be desirable to shut off the engine 12 in order to improve fuel economy. However, during an automatic engine stop event, the engine 12 is shut down, which ordinarily causes a loss of hydraulic fluid 44 pressure in the transmission hydraulic circuit and clutches. In order to properly control the transmission 14 upon engine re-start and vehicle launch, it is desirable to trap some or all of the hydraulic fluid of the clutch cavity within the clutch cavity of the torque transmitting mechanism 114 so that there is no delay with running the transmission 14 upon restart of the engine 12. Accordingly, the latching valve 120 latches fluid within the clutch cavity of the torque transmitting mechanism 114, even when the engine 12 is turned off. Therefore, when the engine 12 is restarted, the torque transmitting mechanism 114 is ready to operate with little delay time because it has hydraulic fluid already in it.

In some situations, however, it may be desirable to unlatch the latching valve 120 and the clutch cavity of the torque transmitting mechanism 114, and to disengage and drain the torque transmitting mechanism 114. For example, if the vehicle 5 is stopped at a light, but the driver decides to travel in reverse, it may no longer be desirable to trap fluid in the clutch cavity of the torque transmitting mechanism 114. Instead, the torque transmitting mechanism 114 may need to be drained to achieve another gear state that may include the "reverse" gear state. This would be the case when the torque transmitting mechanism 114 is used for engaging the vehicle 5 in drive, but not in reverse. In other situations, it may be desirable to unlatch the torque transmitting mechanism 114 for faster shift times, or in other scenarios. To release hydraulic fluid from the torque transmitting mechanism 114, the latching valve 120 must be opened, however, if the engine is off or if the torque transmitting mechanism 114 is not in use, no fluid pressure is being applied to the torque transmitting mechanism 114 through the clutch feed line 112. As such, the fluid pressure needed to open the latching valve 120 is unavailable from the clutch feed line 112.

The latching clutch control system 110 includes a hydraulic pressure storage circuit 122 to apply hydraulic fluid pressure to the latching valve 120 when clutch feed pressure is unavailable. The hydraulic pressure storage circuit 122 includes a pair of accumulators 124, 125. It should be understood, however, that greater or fewer than two accumulators 124, 125 could alternatively be employed. Similar to the accumulator circuit 52 above, the accumulators 124, 125 are energy storage devices in which hydraulic fluid is held under pressure within the accumulators 124, 125. The pair of accumulators 124, 125 is operable to supply pressurized fluid to the latching valve 120, as explained in further detail below.

The hydraulic pressure storage circuit 122 may also include other elements, such as solenoids, pressure sensors or estimators, or other types of sensors, such as volume or position sensors (not shown).

The pair of accumulators 124, 125 is connected to and charged by one or more accumulator charge lines 128, which could be connected to another clutch feed line, a control fluid line, or the main line pressure circuit 60, by way of example. Charge pressure is stored in the accumulators 124, 125 during normal operating of the transmission 14, for example. It should be understood that the accumulators 124, 125 could alternatively be filled by a different hydraulic circuit, without falling beyond the spirit and scope of the present invention. One-way valves 130, such as ball checkvalves, and an orifice 131 are disposed in the accumulator charge line 128 upstream of the accumulators 124, 125. The one-way valves 130 allow hydraulic fluid to enter into the accumulators 124, 125 to charge the accumulators 124, 125 but prevent the fluid from draining back out of the accumulators 124, 125 through the inlet 123 of the accumulator feed line 128.

Along with the one-way valves 130, a pair of release valves 132, 133, which are normally closed, trap hydraulic fluid within the charged accumulators 124, 125. In some variations, the release valves 132, 133 are integrated into a single valve, if desired. The release valves 132, 133 may be opened in any suitable way, such as by feeding fluid to the release valves 132, 133 through the control fluid passage or line 126 or by activating an electromagnet or another signal, by way of example. In FIG. 3, the release valves 132, 133 are opened by a control fluid that is fed into the control fluid passage 126 to place pressure on a side 134, 135, or other elements, of each of the release valves 132, 133, which causes the release valves 132, 133 each to be compressed against a spring 136, 137. The release valves 132, 133 could be poppet valves or any other suitable valve.

When a predetermined amount of pressure is exerted on the sides 134, 135, or other elements, of the release valves 132, 133 by the fluid in the control fluid passage 126, the release valves 132, 133 open. When the release valves 132, 133 are opened, hydraulic fluid flows from the accumulators 124, 125. The first accumulator 124 provides hydraulic fluid to a clutch closure line 138 when the first release valve 132 is opened. Hydraulic fluid pressure in the clutch closure line 138 exerts a force on a side 140, or other element, of the clutch feed valve 118 and causes the clutch feed valve 118 to move against a spring 142 and close the clutch feed line 112.

The second accumulator 125 provides hydraulic fluid pressure to the latching valve 120 through an unlatch fluid line 144. The hydraulic fluid pressure provided by the second accumulator 125 to the latching valve is provided at a high enough pressure, for example, between about 1 and 10 bars, to unlatch the latching valve 120. In other words, the second accumulator 125 pressurizes the unlatch fluid line 144 and raises the pressure in the unlatch fluid line 144 exerted against the latching valve 120 above a predetermined unlatching pressure. Upon the unlatching of the latching valve 120, the latching valve 120 is opened and the fluid in the clutch cavity of the torque transmitting mechanism 114 is released to the unlatch fluid line 144.

A first orifice 146, which is sized relatively small, such as between about half of a millimeter and five millimeters, by way of example, is disposed in fluid communication with the clutch closure line 138 to slowly drain the clutch closure line 138 to the sump 46. When the clutch closure line 138 is substantially drained to the sump 46, the clutch feed valve 118 opens due to the force of the spring 142. A second orifice 148, which is also sized relatively small, such as between about half of a millimeter and five millimeters, by way of example, may optionally be disposed in fluid communication with the unlatch fluid line 144 to slowly drain the unlatch fluid line 144 to the sump 46. In some embodiments, the second orifice 148 may be omitted. After the latching valve 120 is opened, the hydraulic fluid from the clutch cavity of the torque transmitting mechanism 114 may be drained through the second orifice 148 to the sump 46 and/or through the inlet 116 to the clutch feed line 112. The orifices 146, 148 provide a constant leak that releases pressure in the clutch closure line 138 and the unlatch fluid line 144, respectively.

After enough of the pressure is released through the first orifice 146, the clutch feed valve 118 opens due to the force of the spring 142, thereby opening the clutch feed line 112 and further draining the hydraulic fluid from the system 110, including from the torque transmitting mechanism 114 and the unlatch fluid line 144. The latching valve 120 needs only to be pressurized for a short period of time to unlatch, for example, in the range of about one millisecond to about one second, or another transient period of time.

The latching clutch control system 110 may also include software, for example, in the controller 36 (FIG. 2), to monitor the vehicle conditions and determine if the latching valve 120 should be latched or unlatched, and whether to use the pair of accumulators 124, 125 and the clutch feed fluid through the clutch feed line 112. The latching valve 120 may be enabled either by the clutch feed fluid through the clutch feed line 112 or by providing fluid through the accumulator 125 through the clutch closure line 144.

Figure 4:
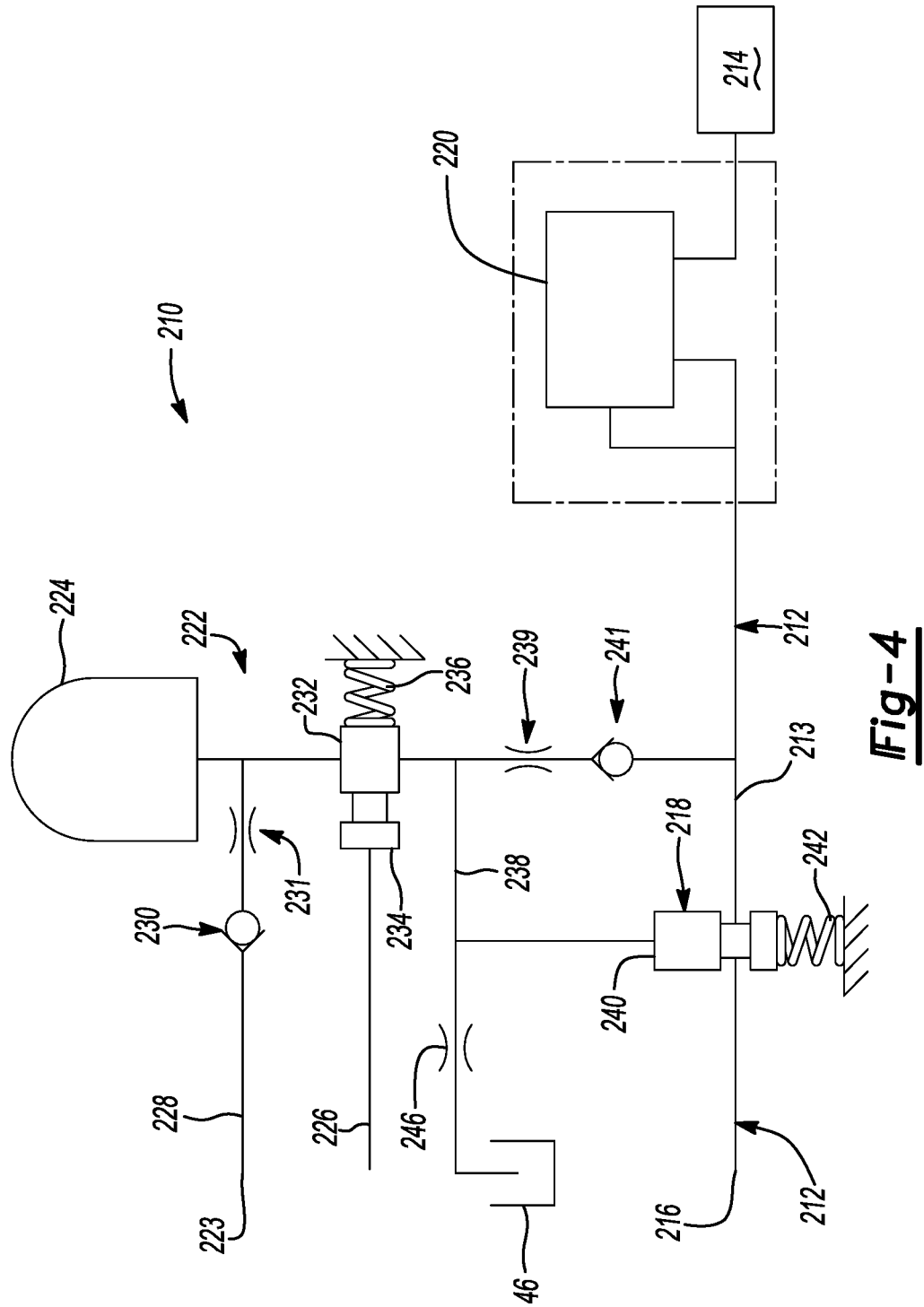
FIG. 4 is a schematic diagram of another variation of a latching clutch control system, in accordance with the principles of the present invention.

Referring to FIG. 4, another example of a latching clutch control system for use as part of the clutch actuation circuit 48 is illustrated and generally designated at 210. The latching clutch control system 210 includes a clutch feed channel 212 in fluid communication with a torque transmitting mechanism 214, such as a clutch or brake. When the torque transmitting mechanism 214 is engaged, hydraulic fluid is fed into an inlet 216 of the clutch feed channel 212 past a normally open clutch feed valve 218, such as a poppet valve, through a latching valve 220, and into the torque transmitting mechanism 214.

The latching valve 220 is latched and unlatched by a pressure higher than its normal operating pressure, as explained above with reference to the latching valve 120 of FIG. 3. The latching valve 220 latches (closes) and holds fluid within the clutch cavity of the torque transmitting mechanism 214 when the fluid pressure of the hydraulic fluid entering the latching valve 220 through the clutch feed channel 212 exceeds a predetermined threshold. In some circumstances, it might be desirable to latch the hydraulic fluid within the torque transmitting mechanism 214, and in other circumstances, it may be desirable to release the fluid from the torque transmitting mechanism 214, even if the clutch feed line 212 is not being supplied with hydraulic fluid.

The latching clutch control system 210 includes a hydraulic pressure storage circuit 222 to apply hydraulic fluid pressure to the latching valve 220 when clutch feed pressure is unavailable. The hydraulic pressure storage circuit 222 includes an accumulator 224. It should be understood, however, that more than one accumulator 224 could alternatively be employed. Similar to the accumulator circuit 52 and the accumulators 124, 125 described above, the accumulator 224 is an energy storage device in which hydraulic fluid is held under pressure within the accumulator 224. The accumulator 224 is operable to supply pressurized fluid to the latching valve 220, as explained in further detail below. The hydraulic pressure storage circuit 222 may also include other elements, such as solenoids, pressure sensors or estimators, or other types of sensors, such as volume or position sensors (not shown).

The accumulator 224 is connected to and charged by one or more accumulator charge lines 228, which could be connected to another clutch feed line, a control fluid line, or the main line pressure circuit 60 (FIG. 2), by way of example. Charge pressure is stored in the accumulator 224 during normal operating of the transmission 14, for example. It should be understood that the accumulator 224 could alternatively be filled by a different hydraulic circuit, without falling beyond the spirit and scope of the present invention. A one-way valve 230, such as a ball check-valve, and an orifice 231 are disposed in the accumulator charge line 228 upstream of the accumulator 224, which allows hydraulic fluid to enter into the accumulator 224 to charge the accumulator 224 but prevents the fluid from draining back out of the accumulator 224 through the inlet 223 to the accumulator feed line 228.

A release valve 232, which is normally closed, traps hydraulic fluid within the charged accumulator 224. The release valve 232 may be opened in any suitable way, such as by feeding fluid to the release valve 232 through the control fluid passage 226 or by activating an electromagnet or another signal, by way of example. In FIG. 4, the release valve 232 is opened by a control fluid that is fed into the control fluid passage 226 to place pressure on a side 234, or other element, of the release valve 232, which causes the release valve 232 to be compressed against a spring 236. The release valve 232 could be a poppet valve or any other suitable valve.

When a predetermined amount of pressure is exerted on the side 234, or other element, of the release valve 232 by the fluid in the control fluid passage 226, the release valve 232 opens. When the release valve 232 is opened, hydraulic fluid flows from the accumulator 224. The accumulator 224 provides hydraulic fluid to a clutch closure line 238 when the release valve 232 is opened. Hydraulic fluid pressure in the clutch closure line 238 exerts a force on a side 240, or other element, of the clutch feed valve 218 and causes the clutch feed valve 218 to be compressed against a spring 242 and close the latching clutch side 213 of the clutch feed line 212 off from the inlet 216 of the clutch feed line 212. Hydraulic fluid in the clutch closure line 238 is also provided through an orifice 239 and past a one-way valve 241, which may be a ball check-valve, into the clutch feed line 212. As the clutch feed valve 218 is closed by the hydraulic fluid pressure in the clutch closure line 238, hydraulic fluid entering the clutch feed line 212 from the clutch closure line 238 will exert a pressure on the latching valve 220. Thus, the accumulator 224 provides hydraulic fluid pressure to the latching valve 220 through the clutch closure line 238 and the clutch feed line 212.

The hydraulic fluid pressure provided by the accumulator 224 to the latching valve 220 is provided at a high enough pressure, for example, at between about 1 and 10 bars, to unlatch the latching valve 220. In other words, the accumulator 224 pressurizes the clutch feed line 212 and raises the pressure in the clutch feed line 212 and the latching valve 220 above a predetermined unlatching pressure. Upon the unlatching of the latching valve 220, the latching valve 220 is opened and the fluid in the clutch cavity of the torque transmitting mechanism 214 may be released into the clutch feed line 212, however, some of the fluid will remain in the torque transmitting mechanism 214 because the clutch feed valve 218 and the one-way valve 241 prevent fluid from escaping from the latching clutch side 213 of the clutch feed line 212. The latching valve 220 needs only to be pressurized for a short period of time to unlatch, for example, in the range of about one millisecond to about one second, or another transient period of time.

The orifice 239 slows down the unlatching of the latching valve 220. Pressure builds up behind the one-way valve 241 before the one-way valve 241 is opened, and the orifice 239 keeps fluid from immediately pressurizing and opening the one-way valve 241 upon discharge of the accumulator 224. After the accumulator 224 is discharged, fluid passes through the orifice 239, and after a certain amount of fluid passes through the orifice 239, the fluid pressure will open the one-way valve 241. Therefore, the clutch feed valve 218 is closed by the fluid from the accumulator 224 exerting pressure on the side 240 of the accumulator 224 before enough fluid pressure passes the orifice 239 to open the one-way valve 241 and unlatch the latching valve 220. Because the clutch feed valve 218 is closed before the latching valve 220 is unlatched, fluid passing through the one-way valve 241 is prevented from merely draining out of the inlet 216 to the clutch feed line 212 and failing to unlatch the latching valve 220.

An orifice 246, which is sized relatively small, such as between about half of a millimeter and five millimeters, by way of example, is disposed in fluid communication with the clutch closure line 238 to slowly drain the clutch closure line 238 to the sump 46. In some embodiments, the orifice 246 is much, much smaller than the orifice 239; for example, the orifice 246 may be about 5% to about 50% of the size of the orifice 239. The orifice 246 provides a constant leak that releases pressure in the clutch closure line 238. When the clutch closure line 238 is drained to the sump 46 enough so that the force of the fluid pressure in the clutch closure line 238 acting upon the clutch feed valve 218 is less than the spring force of the spring 242, the clutch feed valve 218 opens due to the force of the spring 242. After the clutch feed valve 218 is opened, the hydraulic fluid from the clutch cavity of the torque transmitting mechanism 214 and the clutch side 213 of the clutch feed line 212 may be drained through the clutch release valve 218.

The latching clutch control system 210 may also include software, for example, in the controller 36 (FIG. 2), to monitor the vehicle conditions and determine if the latching valve 220 should be latched or unlatched, and whether to open the release valve 232 to provide fluid pressure from the accumulator 224 to the latching valve 220. The latching valve 220 may be enabled either by the clutch feed fluid through the clutch feed line 212 by way of the clutch release valve 218 or by providing fluid from the accumulator 224 through the clutch closure line 238, the orifice 239, the one-way valve 241, and the clutch side 213 of the clutch feed line 212.

Figure 5:
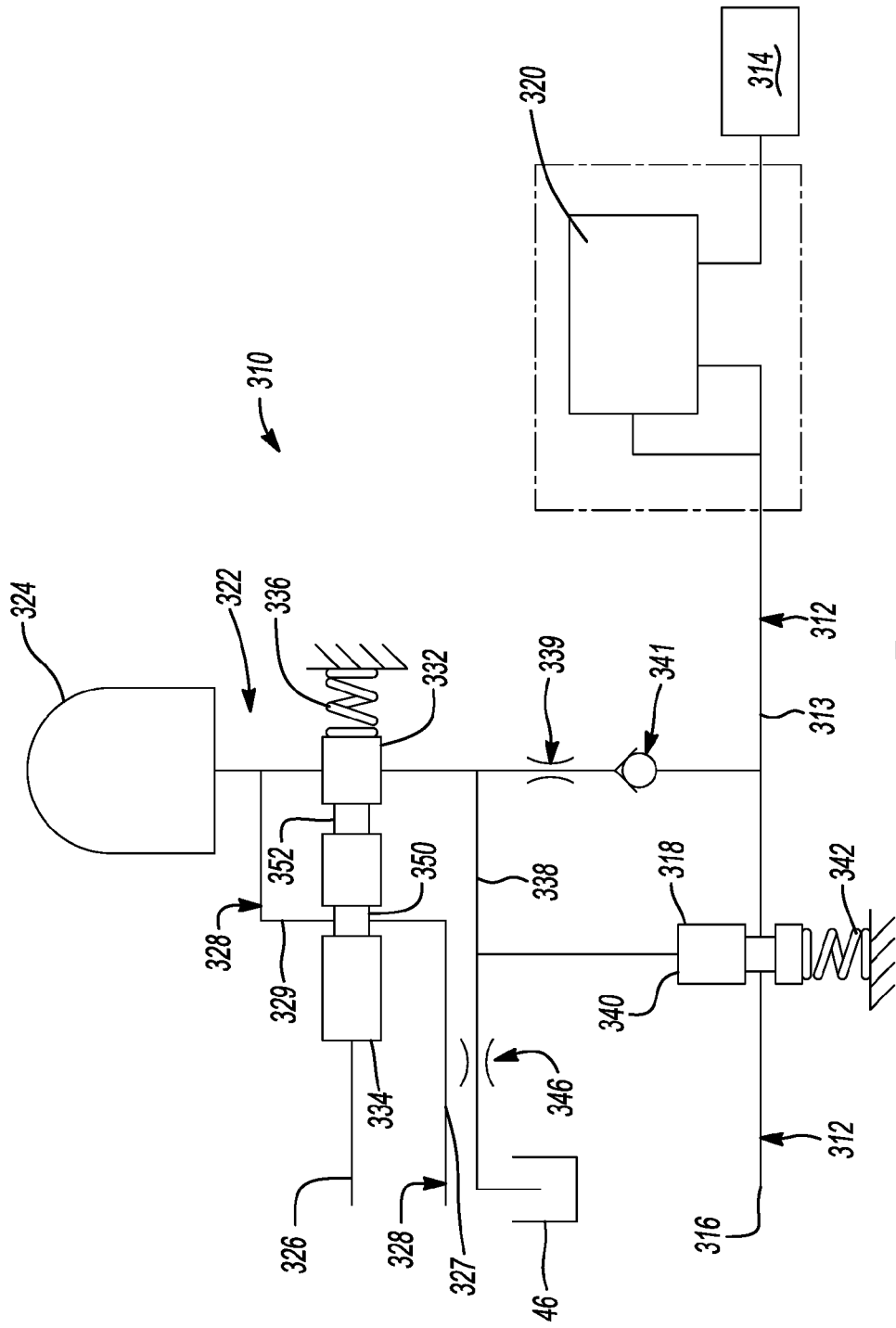
FIG. 5 is a schematic diagram of yet another variation of a latching clutch control system, according to the principles of the present invention.

Referring now to FIG. 5, yet another example of a latching clutch control system for use as part of the clutch actuation circuit 48 is illustrated and generally designated at 310. The latching clutch control system 310 includes a clutch feed channel 312 in fluid communication with a torque transmitting mechanism 314, such as a clutch or brake. When the torque transmitting mechanism 314 is engaged, hydraulic fluid is fed into an inlet 316 of the clutch feed channel 312 past a normally open clutch feed valve 318, such as a poppet valve, through a latching valve 320, and into the torque transmitting mechanism 314.

The latching valve 320 is latched and unlatched by a pressure higher than its normal operating pressure, as explained above with reference to the latching valve 120 of FIG. 3. The latching valve 320 latches (closes) and holds fluid within the clutch cavity of the torque transmitting mechanism 314 when the fluid pressure of the hydraulic fluid entering the latching valve 320 through the clutch feed channel 312 exceeds a predetermined threshold. In some circumstances, it might be desirable to latch the hydraulic fluid within the torque transmitting mechanism 314, and in other circumstances, it may be desirable to release the fluid from the torque transmitting mechanism 314, even if the clutch feed line 312 is not being supplied with hydraulic fluid.

The latching clutch control system 310 includes a hydraulic pressure storage circuit 322 to apply hydraulic fluid pressure to the latching valve 320 when clutch feed pressure is unavailable. The hydraulic pressure storage circuit includes an accumulator 324. It should be understood, however, that more than one accumulator 324 could alternatively be employed. Similar to the accumulator circuit 52 and the accumulators 124, 125, 224 described above, the accumulator 324 is an energy storage device in which hydraulic fluid is held under pressure within the accumulator 324. The accumulator 324 is operable to supply pressurized fluid to the latching valve 320, as explained in further detail below. The hydraulic pressure storage circuit 322 may also include other elements, such as solenoids, pressure sensors or estimators, or other types of sensors, such as volume or position sensors (not shown).

The accumulator 324 is connected to and charged by one or more accumulator charge lines 328, which could be connected to another clutch feed line, a control fluid line, or the main line pressure circuit 60 (FIG. 2), by way of example. The charge fluid enters the accumulator through a charge and release control valve 332 that has a first opening 350 and second opening 352. The first opening 350 connects an upstream portion 327 of the accumulator charge line 328 with a downstream portion 329 of the accumulator charge line 328, wherein the downstream portion 329 is connected to the accumulator 324. The first opening 350 of the charge and release valve 332 is normally open.

The first opening 350 of the charge and release valve 332 is closed by fluid pressure fed into a control fluid line 326. When a pressurized fluid is fed into the control fluid line 326, the fluid exerts a pressure on a back side 334, or other element, of the charge and release valve 332 and closes the first opening 350, thereby causing the release valve 332 to be compressed against a spring 336 and closing the accumulator charge line 328. In some variations, a one-way valve (not shown) may also be included near the accumulator 324 in the downstream portion 329 of the accumulator charge line 328, to prevent fluid from draining from the accumulator 324 out of the accumulator charge line 328. Charge pressure is stored in the accumulator 324 during normal operating of the transmission 14, for example. It should be understood that the accumulator 324 could alternatively be filled by a different hydraulic circuit, without falling beyond the spirit and scope of the present invention.

The charge and release valve 332 blocks hydraulic fluid within the charged accumulator 324 from exiting the hydraulic pressure storage circuit 322, including the accumulator 324, through the clutch closure line 338, because the second opening 352 of the charge and release valve 332 is normally closed. The charge and release valve 332 may be moved to open the second opening 352, thereby fluidly connecting the clutch closure line 338 and with the accumulator charge line 328 and the accumulator 324.

The charge and release valve 332 may be moved in any suitable way, such as by feeding fluid to the charge and release valve 332 through the control fluid passage 326 or by activating an electromagnet or another signal, by way of example. In FIG. 5, the charge and release valve 332 opens the second opening 352 and closes the first opening 350 simultaneously when a pressurized control fluid is fed into the control fluid passage 326 and places pressure on the back side 334, or other element, of the charge and release valve 332, which causes the charge and release valve 332 to be compressed against a spring 336. The charge and release valve 332 could be a poppet valve or any other suitable valve.

When a predetermined amount of pressure is exerted on the back side 334, or other element, of the charge and release valve 332 by the fluid in the control fluid passage 326, the charge and release valve 332 opens the second opening 352, thereby fluidly connecting the clutch closure line 338 with the accumulator 324 and the downstream portion 329 of the accumulator charge line 328, and simultaneously, the charge and release valve 332 closes the first opening 350, thereby disconnecting the upstream and downstream portions 327, 329 of the accumulator charge line 328. When the second opening 352 is opened by the charge and release valve 332, hydraulic fluid flows from the accumulator 324 into the clutch closure line 338. Hydraulic fluid pressure in the clutch closure line 338 exerts a force on a side 340, or other element, of the clutch feed valve 318 and causes the clutch feed valve 318 to move against a spring 342 and close the clutch feed line 312.

Hydraulic fluid in the clutch closure line 338 is also provided through an orifice 339 and past a one-way valve 341, which may be a ball check-valve, into the clutch feed line 312. Because the clutch feed valve 318 is closed by the hydraulic fluid pressure in the clutch closure line 338, hydraulic fluid entering the clutch feed line 312 from the clutch closure line 338 will exert a pressure on the latching valve 320. Thus, the accumulator 324 provides hydraulic fluid pressure to the latching valve 320 through the clutch closure line 338 and the clutch feed line 312.

The hydraulic fluid pressure provided by the accumulator 324 to the latching valve 320 is provided at a high enough pressure, for example, between about 1 and 10 bars, to unlatch the latching valve 320. In other words, the accumulator 324 pressurizes the clutch feed line 312 and raises the pressure in the clutch feed line 312 and the latching valve 320 above a predetermined unlatching pressure. Upon the unlatching of the latching valve 320, the latching valve 320 is opened and the fluid in the clutch cavity of the torque transmitting mechanism 314 may be released into the clutch feed line 312, however, some of the fluid will remain in the torque transmitting mechanism 314 because the clutch feed valve 318 and the one-way valve 341 prevent fluid from escaping from the latching clutch side 313 of the clutch feed line 312. The latching valve 320 needs only to be pressurized for a short period of time to unlatch, for example, between about one millisecond and about one second.

The orifice 339 slows down the unlatching of the latching valve 320. Pressure builds up behind the one-way valve 341 before the one-way valve 341 is opened, and the orifice 339 keeps fluid from immediately pressurizing and opening the one-way valve 341 upon discharge of the accumulator 324. After the accumulator 324 is discharged, fluid passes through the orifice 339, and after a certain amount of fluid passes through the orifice 339, the fluid pressure will open the one-way valve 341. Therefore, the clutch feed valve 318 is closed by the fluid from the accumulator 324 exerting pressure on the side 340 of the accumulator 324 before enough fluid pressure passes the orifice 339 to open the one-way valve 341 and unlatch the latching valve 320. Because the clutch feed valve 318 is closed before the latching valve 320 is unlatched, fluid passing through the one-way valve 341 is prevented from merely draining out of the inlet 316 to the clutch feed line 312 and failing to unlatch the latching valve 320.

An orifice 346, which is sized relatively small, such as between about half of a millimeter and five millimeters, by way of example, is disposed in fluid communication with the clutch closure line 338 to slowly drain the clutch closure line 338 to the sump 46. In some embodiments, the orifice 346 is much, much smaller than the orifice 339; for example, the orifice 346 may be about 5% to about 50% of the size of the orifice 339. The orifice 346 provides a constant leak that releases pressure in the clutch closure line 338. When the clutch closure line 338 is substantially drained to the sump 46, the clutch feed valve 318 opens due to the force of the spring 342. After the clutch feed valve 318 is opened, the hydraulic fluid from the clutch cavity of the torque transmitting mechanism 314 and the clutch side 313 of the clutch feed line 312 may be drained through the clutch release valve 318.

The latching clutch control system 310 may also include software, for example, in the controller 36 (FIG. 2), to monitor the vehicle conditions and determine if the latching valve 320 should be latched or unlatched, and whether to move the charge and release valve 332 to provide fluid pressure from the accumulator 324 to the clutch closure line 338. The latching valve 320 may be enabled either by the clutch feed fluid through the clutch feed line 312 by way of the clutch release valve 318 or by providing fluid from the accumulator 324 to the clutch closure line 338, the orifice 339, the one-way valve 341, and the clutch side 313 of the clutch feed line 312.

Figure 6:
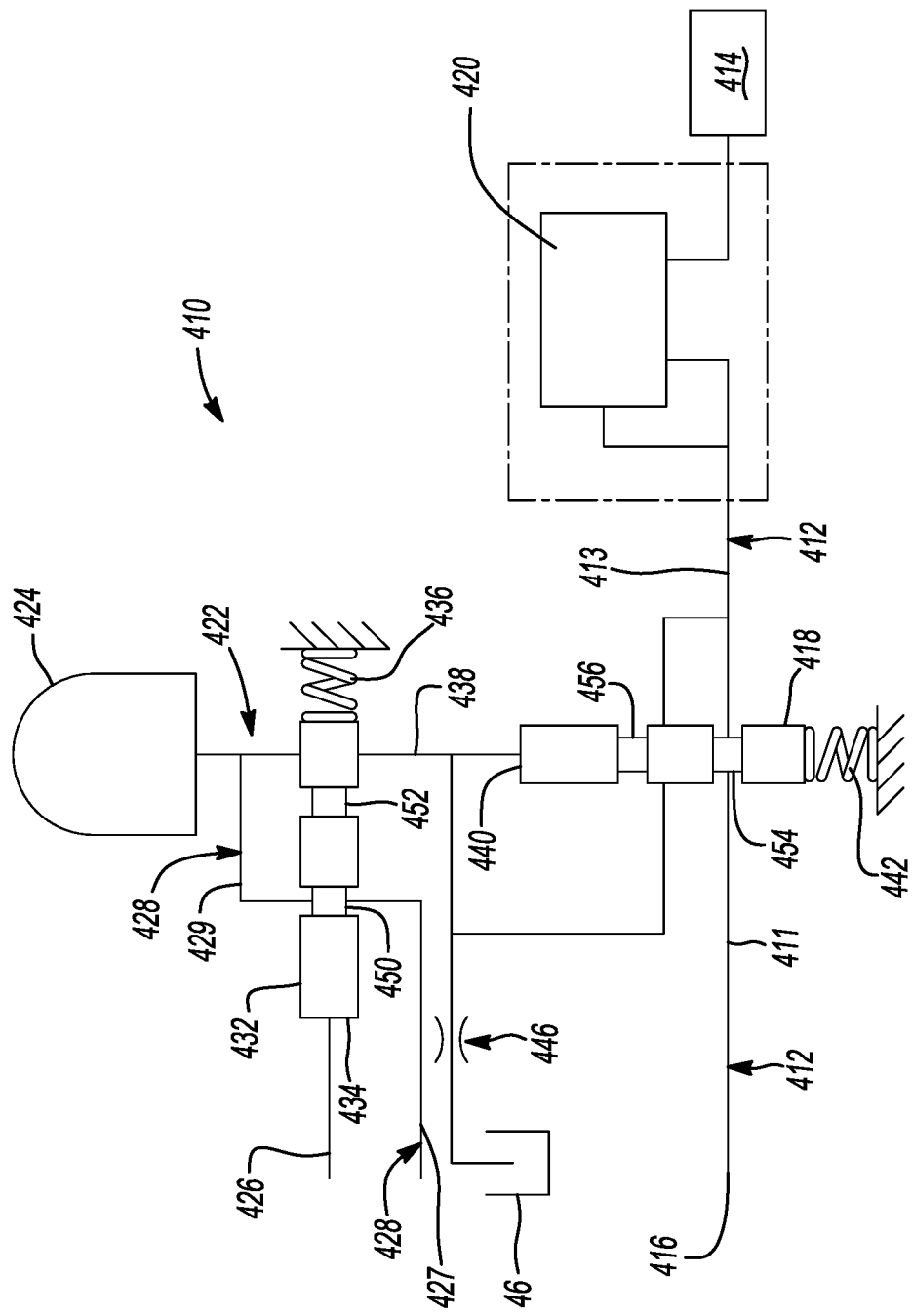
FIG. 6 is a schematic diagram of still another variation of a latching clutch control system, in accordance with the principles of the present invention.

Referring now to FIG. 6, still another example of a latching clutch control system for use as part of the clutch actuation circuit 48 is illustrated and generally designated at 410. The latching clutch control system 410 includes a clutch feed channel 412 in fluid communication with a torque transmitting mechanism 414, such as a clutch or brake. When the torque transmitting mechanism 414 is engaged, hydraulic fluid is fed into an inlet 416 of the clutch feed channel 412 past a normally open clutch feed valve 418 (that is, the clutch feed valve 418 is normally open to the clutch control side 411 of the clutch feed channel 412). The clutch feed valve 418 may be a poppet valve, by way of example. After the hydraulic fluid passes from the clutch control side 411 of the clutch feed channel 412, through the clutch feed valve 418, it flows through a latching clutch side 413 of the clutch feed channel 412, through a latching valve 420, and into the torque transmitting mechanism 414.

The latching valve 420 is latched and unlatched by a pressure higher than its normal operating pressure, as explained above with reference to the latching valve 120 of FIG. 3. The latching valve 420 latches (closes) and holds fluid within the clutch cavity of the torque transmitting mechanism 414 when the fluid pressure of the hydraulic fluid entering the latching valve 420 through the clutch feed channel 412 exceeds a predetermined threshold. In some circumstances, it might be desirable to latch the hydraulic fluid within the torque transmitting mechanism 414, and in other circumstances, it may be desirable to release the fluid from the torque transmitting mechanism 414, even if the clutch feed line 412 is not being supplied with hydraulic fluid; in other words, if the torque transmitting mechanism 414 is not being used to transmit torque.

The latching clutch control system 410 includes a hydraulic pressure storage circuit 422 to apply hydraulic fluid pressure to the latching valve 420 when clutch feed pressure to the torque transmitting mechanism 414 is unavailable. The hydraulic pressure storage circuit includes an accumulator 424. It should be understood, however, that more than one accumulator 424 could alternatively be employed. Similar to the accumulator circuit 52 and the accumulators 124, 125, 224, 324 described above, the accumulator 424 is an energy storage device in which hydraulic fluid is held under pressure within the accumulator 424. The accumulator 424 is operable to supply pressurized fluid to the latching valve 420, as explained in further detail below. The hydraulic pressure storage circuit 422 may also include other elements, such as solenoids, pressure sensors or estimators, or other types of sensors, such as volume or position sensors (not shown).

The accumulator 424 is connected to and charged by one or more accumulator charge lines 428, which could be connected to another clutch feed line, a control fluid line, or the main line pressure circuit 60 (FIG. 2), by way of example. The charge fluid enters the accumulator through a charge and release control valve 432 that has a first opening 450 and second opening 452. The first opening 450 connects an upstream portion 427 of the accumulator charge line 428 with a downstream portion 429 of the accumulator charge line 428, wherein the downstream portion 429 is connected to the accumulator 424. The first opening 450 of the charge and release valve 432 is normally open.

The first opening 450 of the charge and release valve 432 may be closed by fluid pressure fed into a control fluid line 426. More particularly, when a pressurized fluid is fed into the control fluid line 426, the fluid exerts a pressure on a back side 434, or other element, of the charge and release valve 432 and closes the first opening 450, thereby closing the accumulator charge line 428. In some variations, a one-way valve (not shown) may also be included near the accumulator 424 in the downstream portion 429 of the accumulator charge line 428, to prevent fluid from draining from the accumulator 424 out of the accumulator charge line 428 through the first opening 450. Charge pressure is stored in the accumulator 424 during normal operating of the transmission 14, for example. It should be understood that the accumulator 424 could alternatively be filled by a different hydraulic circuit, without falling beyond the spirit and scope of the present invention.

The charge and release valve 432 blocks hydraulic fluid within the charged accumulator 424 from exiting the hydraulic pressure storage circuit 422, including the accumulator 424, through the clutch closure line 438, because the second opening 452 of the charge and release valve 432 is normally closed. The charge and release valve 432 may be moved to open the second opening 452, thereby fluidly connecting the clutch closure line 438 and with the downstream portion 429 of the accumulator charge line 428 and the accumulator 424.

The charge and release valve 432 may be moved in any suitable way, such as by feeding fluid to the charge and release valve 432 through the control fluid passage 426 or by activating an electromagnet or another signal, by way of example. In FIG. 6, the charge and release valve 432 opens the second opening 452 and closes the first opening 450 simultaneously when a pressurized control fluid is fed into the control fluid passage 426 and exerts pressure on the back side 434, or other element, of the charge and release valve 432, which causes the charge and release valve 432 to be compressed against a spring 436. The charge and release valve 432 could be a poppet valve or any other suitable valve.

When a predetermined amount of pressure is exerted on the back side 434, or other element, of the charge and release valve 432 by the fluid in the control fluid passage 426, the charge and release valve 432 opens the second opening 452, thereby fluidly connecting the clutch closure line 438 with the accumulator 424 and the downstream portion 429 of the accumulator charge line 428. Simultaneously, the charge and release valve 432 closes the first opening 450, thereby disconnecting the upstream and downstream portions 427, 429 of the accumulator charge line 428. When the second opening 452 of the charge and release valve 432 is opened, hydraulic fluid flows from the accumulator 424 into the clutch closure line 438. Hydraulic fluid pressure in the clutch closure line 438 exerts a force on a side 440, or other element, of the clutch feed valve 418 and causes the clutch feed valve 418 to move against a spring 442 and close off the inlet 416 to the clutch feed line 412.

The clutch feed valve 412 has a first opening 454 and a second opening 456. The first opening 454 fluidly connects the clutch control side 411 of the clutch feed line 412 with the latching clutch side 413 of the clutch feed line 412 when the first opening 454 of the clutch feed valve 412 is open. The first opening 454 of the clutch feed valve 412 is normally open, in this embodiment. When hydraulic fluid in the clutch closure line 438 exerts a force on the side 440, or other element, of the clutch feed valve 418, the fluid pressure pushes the clutch feed valve 418 against the spring 442 and closes the first opening 454. Simultaneously, as the clutch feed valve 418 moves to close the first opening 454, the second opening 456 opens.

The second opening 456 is normally closed, but when opened by virtue of fluid pressure on the side 440, or other element, of the clutch feed valve 418, the second opening 456 fluidly connects the clutch closure line 438 with the latching clutch side 413 of the clutch feed line 412. Thus, hydraulic fluid in the clutch closure line 438 is provided into the latching clutch side 413 of the clutch feed line 412. Since the first opening 454 of the clutch feed valve 418 is closed when the second opening 456 is open, hydraulic fluid entering the latching clutch side 413 of the clutch feed line 412 from the clutch closure line 438 will exert a pressure on the latching valve 420. Thus, the accumulator 424 provides hydraulic fluid pressure to the latching valve 420 through the clutch closure line 438 and the latching clutch side 413 of the clutch feed line 412.

The hydraulic fluid pressure provided by the accumulator 424 to the latching valve 420 is provided at a high enough pressure, for example, between about 1 and 10 bars, to unlatch the latching valve 420. In other words, the accumulator 424 pressurizes the clutch feed line 412 and raises the pressure in the latching clutch side 413 of the clutch feed line 412 and the latching valve 420 above a predetermined unlatching pressure. The latching valve 420 needs only to be pressurized for a short period of time to unlatch, for example, between about one millisecond and about one second.

Upon the unlatching of the latching valve 420, the latching valve 420 is opened and the fluid in the clutch cavity of the torque transmitting mechanism 414 may be released into latching clutch side 413 the clutch feed line 412, however, some of the fluid will remain in the torque transmitting mechanism 414 because the first opening 454 of the clutch feed valve 418 is closed, and therefore, the clutch feed valve 418 initially prevents fluid from escaping from the latching clutch side 413 of the clutch feed line 412. Hydraulic fluid will flow, however, from the latching clutch side 413 to the clutch closure line 438 through the second opening 456 of the clutch feed valve 418. An orifice 446, which is sized relatively small, is disposed in fluid communication with the clutch closure line 438 to slowly drain the clutch closure line 438 to the sump 46. The orifice 446 provides a constant leak that releases pressure in the clutch closure line 438. When the clutch closure line 438 is substantially drained to the sump 46, the force of the spring 442 causes the clutch feed valve to move, thereby opening the first opening 454 and closing the second opening 456 of the clutch feed valve 418. After the first opening 454 of the clutch feed valve 418 is opened, the hydraulic fluid from the clutch cavity of the torque transmitting mechanism 414 and the latching clutch side 413 of the clutch feed line 412 may be drained through the first opening 454 of the clutch release valve 418.

The latching clutch control system 410 may also include software, for example, in the controller 36 (FIG. 2), to monitor the vehicle conditions and determine if the latching valve 420 should be latched or unlatched, and whether to move the charge and release valve 432 to provide fluid pressure from the accumulator 424 to the clutch closure line 438. The latching valve 420 may be enabled either by the clutch feed fluid through the clutch feed side 411 of the clutch feed line 412 by way of the first opening 454 of the clutch release valve 418 or by providing fluid from the accumulator 424 to the clutch closure line 438, through the second opening 456 of the clutch release valve 418, and to the latching clutch side 413 of the clutch feed line 412.

Figure 7:
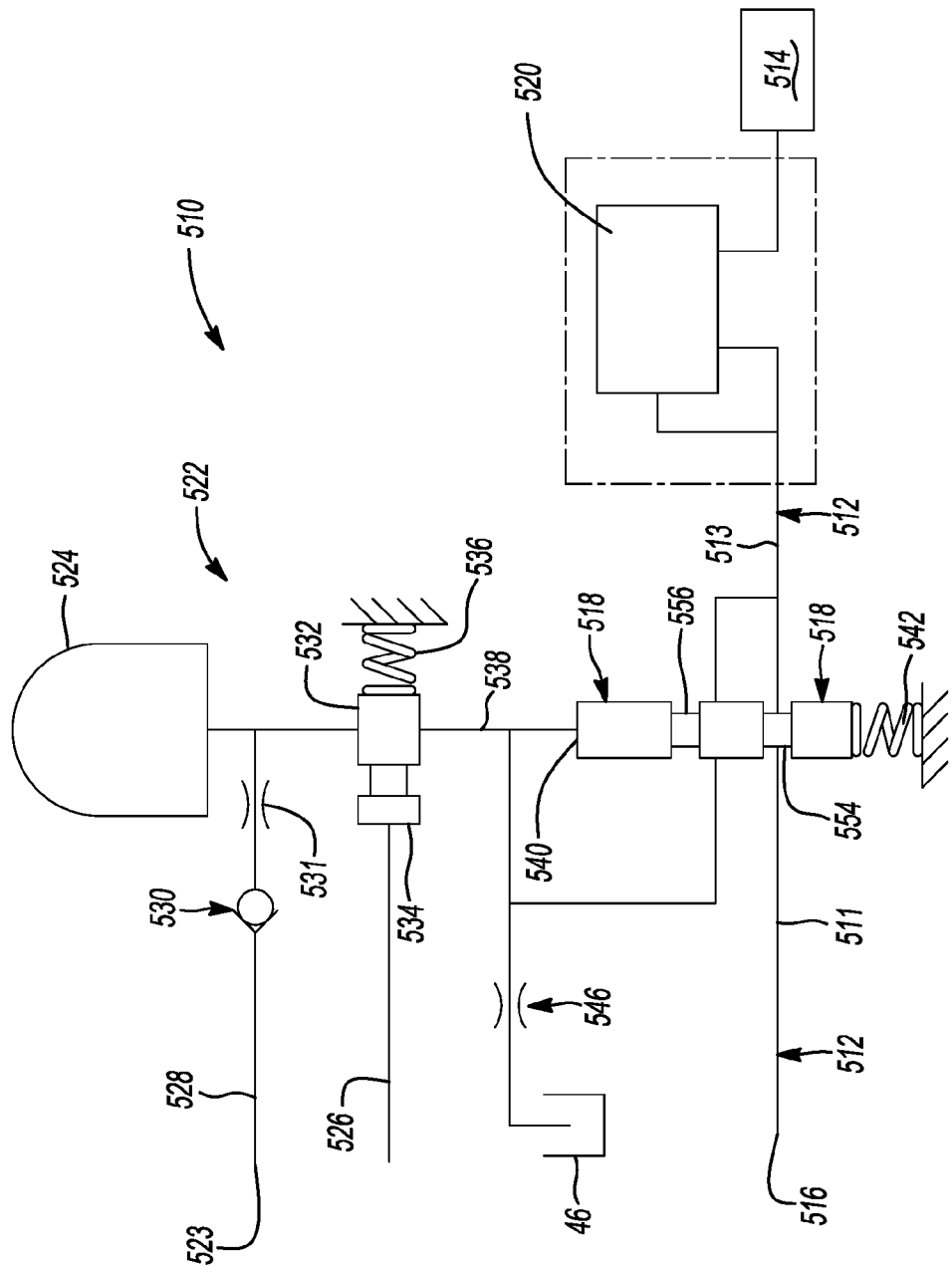
FIG. 7 is a schematic diagram of still another variation of a latching clutch control system, in accordance with the principles of the present invention.

Referring now to FIG. 7, still another example of a latching clutch control system for use as part of the clutch actuation circuit 48 is illustrated and generally designated at 510. The latching clutch control system 510 includes a clutch feed channel 512 in fluid communication with a torque transmitting mechanism 514, such as a clutch or brake. When the torque transmitting mechanism 514 is engaged, hydraulic fluid is fed into an inlet 516 of the clutch feed channel 512 past a normally open clutch feed valve 518 (that is, the clutch feed valve 518 is normally open between the clutch control side 511 and a latching clutch side 513 of the clutch feed channel 512). The clutch feed valve 518 may be a poppet valve, by way of example. After the hydraulic fluid passes from the clutch control side 511 of the clutch feed channel 512, through the clutch feed valve 518, it flows through the latching clutch side 513 of the clutch feed channel 512, through a latching valve 520, and into the torque transmitting mechanism 514.

The latching valve 520 is latched and unlatched by a pressure higher than its normal operating pressure, as explained above with reference to the latching valve 120 of FIG. 3. The latching valve 520 latches (closes) and holds fluid within the clutch cavity of the torque transmitting mechanism 514 when the fluid pressure of the hydraulic fluid entering the latching valve 520 through the clutch feed channel 512 exceeds a predetermined threshold. In some circumstances, it might be desirable to latch the hydraulic fluid within the torque transmitting mechanism 514, and in other circumstances, it may be desirable to release the fluid from the torque transmitting mechanism 514, even if the clutch feed line 512 is not being supplied with hydraulic fluid.

The latching clutch control system 510 includes a hydraulic pressure storage circuit 522 to apply hydraulic fluid pressure to the latching valve 520 when clutch feed pressure is unavailable. The hydraulic pressure storage circuit 522 includes an accumulator 524. It should be understood, however, that more than one accumulator 524 could alternatively be employed. Similar to the accumulator circuit 52 and the accumulators 124, 125, 224, 324, 424 described above, the accumulator 524 is an energy storage device in which hydraulic fluid is held under pressure within the accumulator 524. The accumulator 524 is operable to supply pressurized fluid to the latching valve 520, as explained in further detail below. The hydraulic pressure storage circuit 522 may also include other elements, such as solenoids, pressure sensors or estimators, or other types of sensors, such as volume or position sensors (not shown).

The accumulator 524 is connected to and charged by one or more accumulator charge lines 528, which could be connected to another clutch feed line, a control fluid line, or the main line pressure circuit 60 (FIG. 2), by way of example. Charge pressure is stored in the accumulator 524 during normal operating of the transmission 14, for example. It should be understood that the accumulator 524 could alternatively be filled by a different hydraulic circuit, without falling beyond the spirit and scope of the present invention. A one-way valve 530, such as a ball check-valve, and an orifice 531 are disposed in the accumulator charge line 528 upstream of the accumulator 524, which allows hydraulic fluid to enter into the accumulator 524 to charge the accumulator 524 but prevents the fluid from draining back out of the accumulator 524 through the inlet 523 to the accumulator feed line 528.

A release valve 532, which is normally closed, traps hydraulic fluid within the charged accumulator 524. The release valve 532 may be opened in any suitable way, such as by feeding fluid to the release valve 532 through the control fluid passage 526 or by activating an electromagnet or another signal, by way of example. In FIG. 7, the release valve 532 is opened by a control fluid that is fed into the control fluid passage 526 to place pressure on a side 534, or other element, of the release valve 532, which causes the release valve 532 to be compressed against a spring 536. The release valve 532 could be a poppet valve or any other suitable valve.

When a predetermined amount of pressure is exerted on the side 534, or other element, of the release valve 532 by the fluid in the control fluid passage 526, the release valve 532 opens. When the release valve 532 is opened, hydraulic fluid flows from the accumulator 524. The accumulator 524 provides hydraulic fluid to a clutch closure line 538 when the release valve 532 is opened. Hydraulic fluid pressure in the clutch closure line 538 exerts a force on a side 540, or other element, of the clutch feed valve 518 and causes the clutch feed valve 518 to move against a spring 542 and close off the inlet 516 to the clutch feed line 512.

The clutch feed valve 512 has a first opening 554 and a second opening 556. The first opening 554 fluidly connects the clutch control side 511 of the clutch feed line 512 with the latching clutch side 513 of the clutch feed line 512 when the first opening 554 of the clutch feed valve 512 is open. The first opening 554 of the clutch feed valve 512 is normally open, in this embodiment. When hydraulic fluid in the clutch closure line 538 exerts a force on the side 540, or other element, of the clutch feed valve 518, the fluid pressure pushes the clutch feed valve 518 against the spring 542 and closes the first opening 554. Simultaneously, as the clutch feed valve 518 moves to close the first opening 554, the second opening 556 opens.

The second opening 556 is normally closed, but when opened by virtue of fluid pressure on the side 540, or other element, of the clutch feed valve 518, the second opening 556 fluidly connects the clutch closure line 538 with the latching clutch side 513 of the clutch feed line 512. Thus, hydraulic fluid in the clutch closure line 538 is provided into the latching clutch side 513 of the clutch feed line 512. Since the first opening 554 of the clutch feed valve 518 is closed when the second opening 556 is open, hydraulic fluid entering the latching clutch side 513 of the clutch feed line 512 from the clutch closure line 538 will exert a pressure on the latching valve 520. Thus, the accumulator 524 provides hydraulic fluid pressure to the latching valve 520 through the clutch closure line 538 and the latching clutch side 513 of the clutch feed line 512.

The hydraulic fluid pressure provided by the accumulator 524 to the latching valve 520 is provided at a high enough pressure, for example, between about 1 and 10 bars, to unlatch the latching valve 520. In other words, the accumulator 524 pressurizes the clutch feed line 512 and raises the pressure in the latching clutch side 513 of the clutch feed line 412 and against the latching valve 520 above a predetermined unlatching pressure. The latching valve 520 needs only to be pressurized for a short period of time to unlatch, for example, between about one millisecond and about one second, or another transient period of time.

Upon the unlatching of the latching valve 520, the latching valve 520 is opened and the fluid in the clutch cavity of the torque transmitting mechanism 514 may be released into latching clutch side 513 the clutch feed line 512, however, some of the fluid will remain in the torque transmitting mechanism 514 because the first opening 554 of the clutch feed valve 518 is closed, and therefore, the clutch feed valve 518 initially prevents fluid from escaping from the latching clutch side 513 of the clutch feed line 512. Hydraulic fluid will flow, however, from the latching clutch side 513 to the clutch closure line 538 through the second opening 556 of the clutch feed valve 518. An orifice 546, which is sized relatively small, is disposed in fluid communication with the clutch closure line 538 to slowly drain the clutch closure line 538 to the sump 46. The orifice 546 provides a constant leak that releases pressure in the clutch closure line 538.

When the clutch closure line 538 is substantially drained to the sump 46, the force of the spring 542 causes the clutch feed valve to move, thereby opening the first opening 554 and closing the second opening 556 of the clutch feed valve 518. After the first opening 554 of the clutch feed valve 518 is opened, the hydraulic fluid from the clutch cavity of the torque transmitting mechanism 514 and the latching clutch side 513 of the clutch feed line 512 may be drained through the first opening 554 of the clutch release valve 518.

The latching clutch control system 510 may also include software, for example, in the controller 36 (FIG. 2), to monitor the vehicle conditions and determine if the latching valve 520 should be latched or unlatched, and whether to move the release valve 532 to provide fluid pressure from the accumulator 524 to the clutch closure line 538. The latching valve 520 may be enabled either by the clutch feed fluid through the clutch feed side 511 of the clutch feed line 512 by way of the first opening 554 of the clutch release valve 518 or by providing fluid from the accumulator 524 to the clutch closure line 538, through the second opening 556 of the clutch release valve 518, and to the latching clutch side 513 of the clutch feed line 512.

The control fluid for any of the control fluid passages 126, 226, 326, 426, 526 could come from line pressure in the main line circuit 60, from another clutch feed circuit (for example, the feed to a clutch that is engaged in reverse), or from any other suitable source. In one variation, fluid is fed to the control fluid passage 126, 226, 326, 426, 526 from a clutch feed line of a different torque transmitting mechanism (not the torque transmitting mechanism 114, 214, 314, 414, 514). For example, a feed line that activates a reverse clutch or brake could also feed the control fluid passage 126, 226, 326, 426, 526. In one embodiment, a clutch that is engaged in reverse, third gear, and fifth gear is in fluid communication with the control fluid passage 126, 226, 326, 426, 526. In another embodiment, a clutch that is engaged in fourth gear, fifth gear, and sixth gear is in fluid communication with the control fluid passage 126, 226, 326 426, 526.

Preferably, the valves 118, 132, 133, 218, 232, 318, 332, 418, 432, 518, 532 have little (negligible) or no leakage.

Figure 8:
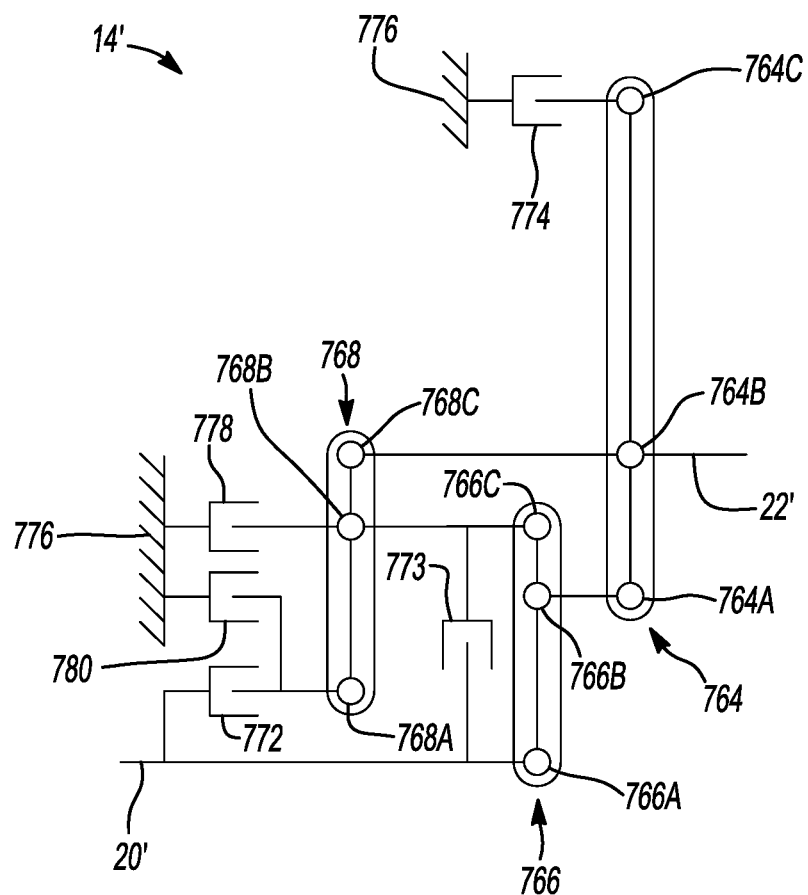
FIG. 8 is a lever diagram of an example of a transmission in accordance with the present invention.

Referring now to FIG. 8, a lever of a transmission having one or more of the latching clutch control systems 110, 210, 310, 410 is illustrated and generally designated at 14'. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. In some cases, two levers may be combined into a single lever having more than three nodes (typically four nodes). For example, if two nodes on each of two different levers are interconnected through a fixed connection they may be represented as a single node on a single lever. The relative length between the nodes of each lever can be used to represent the ring-to-sun diameter or tooth count ratio of each respective gear set. These lever ratios, in turn, are used to vary the gear ratios of the transmission in order to achieve an appropriate ratio and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 14' includes an input shaft or member 20', a first planetary gear set 764, a second planetary gear set 766, a third planetary gear set 768, and an output shaft or member 22'. One or more additional planetary gear sets could also be included, if desired. In the lever diagram of FIG. 8, the first planetary gear set 764 has three nodes: a first node 764A, a second node 764B, and a third node 764C. The second planetary gear set 766 has three nodes: a first node 766A, a second node 766B, and a third node 766C. The third planetary gear set 768 has three nodes: a first node 768A, a second node 768B, and a third node 768C.

The input member or shaft 20' is continuously coupled to the first node 766A of the second planetary gear set 766. The output member 22' is continuously coupled to the third node 768C of the third planetary gear set 768 and the second node 764B of the first planetary gear set 764. The first node 764A of the first planetary gear set 764 is continuously coupled to the second node 766B of the second planetary gear set 766. The second node 764B of the first planetary gear set 764 is continuously coupled to the third node 768C of the third planetary gear set 768. The third node 766C of the second planetary gear set 766 is continuously coupled to the second node 768B of the third planetary gear set 768.

A first clutch 772 selectively connects the input member or shaft 20' and the first node 766A of the second planetary gear set 766 with the first node 768A of the third planetary gear set 768. A second clutch 773 selectively connects the input member or shaft 20' and the first node 766A of the second planetary gear set 766 with the second node 768B of the third planetary gear set 768 and the third node 766C of the second planetary gear set 766. A first brake 774 selectively connects the third node 764C of the first planetary gear set 764 with a stationary member or transmission housing 776. A second brake 778 selectively connects the third node 766C of the second planetary gear set 766 and the second node 768B of the third planetary gear set 768 with the stationary member or transmission housing 776. A third brake 780 selectively connects the first node 768A of the third planetary gear set 768 with the stationary member or transmission housing 776. The torque-transmitting mechanisms (the clutches 772, 773 and brakes 774, 778, 780) allow for selective interconnection of shafts or interconnecting members, members of the planetary gear sets and the housing.

The transmission 14' of FIG. 8 includes one of the latching fluid control systems 110, 210, 310, 410 described above. For example, when a vehicle 5 comes to a stop at a light, the vehicle 5 is in first gear and the first brake 774 is engaged. If the engine is turned off, however, the hydraulic fluid in the clutch cavity of the first brake 774 would drain out if not latched. Accordingly, the first brake 774 is operable as the torque transmitting mechanism 114, 214, 314, 414, 514 in FIG. 3, 4, 5, 6, or 7. To prevent the fluid from draining from the first brake 774, the clutch feed line is latched, for example, in one of the ways explained above. To release the latched first brake 774, one of the control fluids is fed to unlatch the bypass valve or latch valve as explained above.

The control fluid could be fluid from the second brake 778 and/or the first clutch 772, for example, which are engaged when the transmission 14' is put into reverse, the third brake 780, which is normally engaged in second and sixth gear in this transmission 14', the second clutch 773, which is normally engaged in fourth, fifth, and sixth gears of the transmission 14', and/or line pressure. For example, control fluid channel 126, 226, 326, 426, 526 (FIGS. 3-7) could be fed from the first clutch 772 or the second clutch 773 (or any other torque transmitting mechanism 778, 780), and the clutch feed for the torque transmitting mechanism 114, 214, 314, 414, 514 could be fed to the first brake 774. The control fluid source could alternatively be from part of the hydraulic control logic and not directly from a clutch feed. For example, a fluid that is pressurized when one or more of the clutch feeds is on, but is not directly from a clutch feed could be used. In one embodiment, a control fluid source is used that is pressurized when either the second clutch 773 or the second brake 778 are applied, but the control fluid source is not the clutch feeds for the second clutch 773 or the second brake 778.

The description of the invention is merely exemplary in nature and variations that do not depart from the gist of the invention are intended to be within the scope of the invention. For example, the elements of the various figures may be combined in any suitable manner, without falling beyond the spirit and scope of the present invention. The valves, including the check-valves, and the channels, passages, and/or lines are intended for illustration purposes only. The valves, including the check-valves, may have any other suitable configuration, without falling beyond the spirit and scope of the present invention. Further, the channels, passages, and/or lines may have any suitable shape or configuration, without falling beyond the spirit and scope of the present invention. The valves and the channels, passages, and/or lines may be configured in any suitable manner to achieve the outcome of latching and unlatching hydraulic fluid within a cavity of a torque transmitting device. Further, any of the embodiments could have one, zero, or multiple control fluid passages. Such variations are not to be regarded as a departure from the spirit and scope of the invention.

What is claimed is:

1. A multiple speed automatic transmission for use with a vehicle having an engine, the multiple speed automatic transmission comprising:
    an input member;
    an output member;
    first, second, and third planetary gear sets each having first, second and third members;
    a first interconnecting member continuously interconnecting the first member of the first planetary gear set with the second member of the second planetary gear set;
    a second interconnecting member continuously interconnecting the second member of the first planetary gear set with the third member of the third planetary gear set;
    a third interconnecting member continuously interconnecting the third member of the second planetary gear set with the second member of the third planetary gear set;
    a first torque transmitting device selectively engageable to interconnect the third member of the first planetary gear set with the stationary member;
    a second torque transmitting device is selectively engageable to interconnect the first member of the third planetary gear set with the first member of the second planetary gear set;
    a third torque transmitting device is selectively engageable to interconnect the second member of the third planetary gear set and the third member of the second planetary gear set with the first member of the second planetary gear set;
    a fourth torque transmitting device is selectively engageable to interconnect the second member of the third planetary gear set and the third member of the second planetary gear set with the stationary member;
    a fifth torque transmitting device is selectively engageable to interconnect the first member of the third planetary gear set with the stationary member; and
    wherein the torque transmitting devices are selectively engageable to establish a plurality of forward speed ratios and at least one reverse speed ratio between the input member and the output member and a latching valve selectively traps pressurized hydraulic fluid within the first torque transmitting device.

2. The multiple speed automatic transmission of claim 1 wherein the first torque transmitting device is in communication with a clutch feed channel configured to provide hydraulic fluid from a pressurized source to the first torque transmitting device when the first torque transmitting device is engaged and the engine is running.

3. The multiple speed automatic transmission of claim 2 wherein the latching valve connects the clutch feed channel to the first torque transmitting device.

4. The multiple speed automatic transmission of claim 3 further including a hydraulic pressure storage circuit that selectively provides pressurized hydraulic fluid to the latching valve to unlatch the latching valve.

5. The multiple speed automatic transmission of claim 4, wherein the hydraulic pressure storage circuit includes an accumulator, the clutch feed channel having an inlet portion and a clutch portion, the hydraulic pressure storage circuit further comprising an inlet valve connecting the inlet portion to the clutch portion, the clutch portion being in communication with the latching valve, the inlet portion being in communication with the source of pressurized hydraulic fluid,
    wherein pressurized hydraulic fluid is stored in the accumulator when the engine is on, the hydraulic pressure storage circuit further comprising a release valve configured to selectively hold the pressurized fluid within the accumulator, the release valve being configured to selectively open to allow the pressurized hydraulic fluid to flow from the accumulator to the latching valve to unlatch the latching valve, and
    wherein the inlet valve is normally open to allow hydraulic fluid to flow from the inlet portion to the clutch portion when the torque transmitting device is engaged, the hydraulic pressure storage circuit being configured to close the inlet valve to unlatch the latching valve.

6. The multiple speed automatic transmission of claim 1, wherein the input member is continuously connected for common rotation with the first member of the second planetary gear set, and the output member is continuously connected for common rotation with the second member of the first planetary gear set and the third member of the third planetary gear set.

7. A multiple speed automatic transmission for use with a vehicle having an engine, the multiple speed automatic transmission comprising:
    an input member;
    an output member;
    first, second, and third planetary gear sets each having first, second and third members, and wherein the input member is continuously connected for common rotation with the first member of the second planetary gear set and the output member is continuously connected for common rotation with the second member of the first planetary gear set;
    three interconnecting members each continuously interconnecting at least one of the first, second, and third members of one of the first, second, and third planetary gear sets with at least one other of the first members, second members, third members of another of the first, second, and third planetary gear sets;
    a first torque transmitting device selectively engageable to interconnect the third member of the first planetary gear set with the stationary member;
    a second torque transmitting device is selectively engageable to interconnect the first member of the third planetary gear set with the first member of the second planetary gear set;

a third torque transmitting device is selectively engageable to interconnect the second member of the third planetary gear set and the third member of the second planetary gear set with the first member of the second planetary gear set;

a fourth torque transmitting device is selectively engageable to interconnect the second member of the third planetary gear set and the third member of the second planetary gear set with the stationary member;

a fifth torque transmitting device is selectively engageable to interconnect the first member of the third planetary gear set with the stationary member; and a latching valve, wherein the latching valve selectively traps pressurized hydraulic fluid within the first torque transmitting device, and wherein the torque transmitting devices are selectively engageable to establish a plurality of forward speed ratios and at least one reverse speed ratio between the input member and the output member.

8. The multiple speed automatic transmission of claim 7 wherein the first torque transmitting device is in communication with a clutch feed channel configured to provide hydraulic fluid from a pressurized source to the first torque transmitting device when the first torque transmitting device is engaged and the engine is running.

9. The multiple speed automatic transmission of claim 8 wherein the latching valve connects the clutch feed channel to the first torque transmitting device.

10. The multiple speed automatic transmission of claim 9 further including a hydraulic pressure storage circuit that selectively provides pressurized hydraulic fluid to the latching valve to unlatch the latching valve.

11. The multiple speed automatic transmission of claim 10, wherein the hydraulic pressure storage circuit includes an accumulator, the clutch feed channel having an inlet portion and a clutch portion, the hydraulic pressure storage circuit further comprising an inlet valve connecting the inlet portion to the clutch portion, the clutch portion being in communication with the latching valve, the inlet portion being in communication with the source of pressurized hydraulic fluid, wherein pressurized hydraulic fluid is stored in the accumulator when the engine is on, the hydraulic pressure storage circuit further comprising a release valve configured to selectively hold the pressurized fluid within the accumulator, the release valve being configured to selectively open to allow the pressurized hydraulic fluid to flow from the accumulator to the latching valve to unlatch the latching valve, and wherein the inlet valve is normally open to allow hydraulic fluid to flow from the inlet portion to the clutch portion when the torque transmitting device is engaged, the hydraulic pressure storage circuit being configured to close the inlet valve to unlatch the latching valve.

12. The multiple speed automatic transmission of claim 7, wherein a first of the three interconnecting members continuously interconnects the first member of the first planetary gear set with the second member of the second planetary gear set, a second of the three interconnecting members continuously interconnects the second member of the first planetary gear set with the third member of the third planetary gear set, and a third of the three interconnecting members continuously interconnects the third member of the second planetary gear set with the second member of the third planetary gear set.

13. A multiple speed automatic transmission for use with a vehicle having an engine, the multiple speed automatic transmission comprising:

an input member;

an output member;

first, second, and third planetary gear sets each having first, second and third members;

a first interconnecting member continuously interconnecting the first member of the first planetary gear set with the second member of the second planetary gear set;

a second interconnecting member continuously interconnecting the second member of the first planetary gear set with the third member of the third planetary gear set;

a third interconnecting member continuously interconnecting the third member of the second planetary gear set with the second member of the third planetary gear set; and a first torque transmitting device selectively engageable to interconnect the third member of the first planetary gear set with the stationary member;

a second torque transmitting device is selectively engageable to interconnect the first member of the third planetary gear set with the first member of the second planetary gear set;

a third torque transmitting device is selectively engageable to interconnect the second member of the third planetary gear set and the third member of the second planetary gear set with the first member of the second planetary gear set;

a fourth torque transmitting device is selectively engageable to interconnect the second member of the third planetary gear set and the third member of the second planetary gear set with the stationary member;

a fifth torque transmitting device is selectively engageable to interconnect the first member of the third planetary gear set with the stationary member;

a latching valve connecting the clutch feed channel to the first torque transmitting device, and wherein the latching valve selectively traps pressurized hydraulic fluid within the first torque transmitting device;

a hydraulic pressure storage circuit that selectively provides pressurized hydraulic fluid to the latching valve to unlatch the latching valve; and wherein the torque transmitting devices are selectively engageable to establish a plurality of forward speed ratios and at least one reverse speed ratio between the input member and the output member, the first torque transmitting device is in communication with a clutch feed channel configured to provide hydraulic fluid from a pressurized source to the first torque transmitting device when the first torque transmitting device is engaged and the engine is running, the first torque transmitting device is in communication with a clutch feed channel configured to provide hydraulic fluid from a pressurized source to the first torque transmitting device when the first torque transmitting device is engaged and the engine is running, the hydraulic pressure storage circuit includes an accumulator, the clutch feed channel having an inlet portion and a clutch portion, the hydraulic pressure storage circuit further comprising an inlet valve connecting the inlet portion to the clutch portion, the clutch portion being in communication with the latching valve, the inlet portion being in communication with the source of pressurized hydraulic fluid, wherein pressurized hydraulic fluid is stored in the accumulator when the engine is on, the hydraulic pressure storage circuit further comprising a release valve configured to selectively hold the pressurized fluid within the accumulator, the release valve being configured to selectively open to allow the pressurized hydraulic fluid to flow from the accumulator to the latching valve to unlatch the latching valve, and wherein the inlet valve is normally open to allow hydraulic fluid to flow from the inlet portion to the clutch portion when the torque transmitting device is engaged, the hydraulic pressure storage circuit being configured to close the inlet valve to unlatch the latching valve.

14. The multiple speed automatic transmission of claim 13, wherein the input member is continuously connected for common rotation with the first member of the second planetary gear set, and the output member is continuously connected for common rotation with the second member of the first planetary gear set and the third member of the third planetary gear set.

* * * * *